United States Patent [19]

Apostolos

[11] Patent Number: 4,701,762
[45] Date of Patent: Oct. 20, 1987

[54] THREE-DIMENSIONAL ELECTROMAGNETIC SURVEILLANCE SYSTEM AND METHOD

[75] Inventor: John T. Apostolos, Merrimack, N.H.

[73] Assignee: Sanders Associates, Inc., Nashua, N.H.

[21] Appl. No.: 788,291

[22] Filed: Oct. 17, 1985

[51] Int. Cl.[4] ...................... G01S 5/02; G06F 15/332
[52] U.S. Cl. ................................... 342/417; 342/195; 342/446; 364/726; 364/827
[58] Field of Search ............. 343/417, 368, 451, 5 SA, 343/5 FT; 364/485, 726, 827; 342/417, 368, 451, 446, 195, 196, 192

[56] References Cited

U.S. PATENT DOCUMENTS 4,060,850 11/1977 Speiser .
4,270,209 5/1981 Albanese ............................ 364/485

OTHER PUBLICATIONS

Klose et al., "A Saw Interferometer Direction Finding and Frequency Identification Method", IEEE MTTs Int'l. Microwave Symp. Dig., 6, 1981, pp. 392–394.

Primary Examiner—Theodore M. Blum
Assistant Examiner—Gregory C. Issing
Attorney, Agent, or Firm—Richard I. Seligman

[57] ABSTRACT

A surveillance system for simultaneously identifying the directions and frequencies of a plurality of electromagnetic-radiation sources includes an irregular array (10) of antenna elements and employs a two-dimensional compressive receiver (14) that receives at its input ports (18) the individual element signals. Each output of the two-dimensional compressive receiver (14) is modulated in an associated modulator (20) by one signal of a composite ensemble of signals. The composite ensemble is the sum of a plurality of individual ensembles, each of which is an ensemble of signals of a frequency uniquely associated with that individual ensemble and individually modulated to favor a direction associated with that individual ensemble. The results are added together in summation circuit 22 and applied to a Bragg cell (24), which segregates the results of modulation by the individual ensembles. When a pulse occurs at one of the output ports (28) of the Bragg cell (24), the time of occurrence of that pulse within the output sweep of the two-dimensional compressive receiver (14) indicates the temporal frequency of the antenna signal that gave rise to it, while the output port on which the pulse occurs is an indication of the direction of the source.

4 Claims, 2 Drawing Figures

4,701,762

THREE-DIMENSIONAL ELECTROMAGNETIC SURVEILLANCE SYSTEM AND METHOD

BACKGROUND OF THE INVENTION

The present invention relates to surveillance systems for determining the directions of electromagnetic-radiation sources and the frequencies at which they radiate. It is particularly beneficial for surveillance systems that employ antenna arrays having irregular shapes.

Arrays of antenna elements are sometimes used for general electromagnetic surveillance; it is desirable for the equipment to monitor several directions and frequencies simultaneously. To monitor a particular direction, the signals from the antenna elements are subjected to different amounts of phase change so that the signals from all of the elements add in phase if the source of the signals is located in the direction being monitored. To change the direction being monitored, one must change the phase shifts applied to the various signals.

One way to monitor several directions simultaneously is simply to send the element signals in parallel to different groups of phase shifters that favor different directions. It has been found in the past, however, that it is not necessary to use such a large amount of hardware to monitor several directions simultaneously. For example, many schemes have employed Fourier transformation or circular-convolution techniques to perform much or all of the signal processing for multiple directions at the same time with the same circuitry. However, most of these techniques rely on a favorable antenna-element geometry. That is, they rely on the geometric properties of linear, circular, or other arrays having regular, simple geometric shapes. Such schemes cannot be used if the array platform does not lend itself to such a simple array geometry.

An object of the present invention is to monitor several directions and frequencies simultaneously in such a way that much of the signal processing for all of the signals is performed by common equipment without requiring that the array have a simple geometry.

SUMMARY OF THE INVENTION

The foregoing and related objects are achieved in a device that employs circuitry, such as a two-dimensional compressive receiver, for generating a temporal Fourier transformation of the antenna-element signals. The system includes waveform-storage devices for storing waveforms associated with all the directions of interest. For each of the plurality of transform signals, there is a group of stored waveforms, each waveform representing the modulation, as a function of frequency, required of that transform signal so that the modulated transform signals, when added together, will favor a different direction of interest. Each direction of interest is assigned a separate oscillator frequency, and a modulator signal for each transform signal is produced from a plurality of oscillator signals, each oscillator signal having one of the assigned oscillator frequencies. Each oscillator signal is modulated in accordance with the waveform associated with the oscillator signal's direction of interest and with the transform signal to be modulated.

Each transform signal is modulated with its modulator signal, and the results of the modulations of all of the transform signals are added together. The resultant composite signal includes a number of frequency bands, each of which is associated with a different direction to be monitored, and these frequency bands are then segregated by, for instance, a one-dimensional Fourier-transformation device. The direction of the source that caused a component in the resultant signal is indicated by the frequency band within which the component lies, and its frequency is indicated by the time of occurrence of that component. By using this apparatus, the signal-to-noise ratios of the transform signals are conserved because the modulation is applied to a given transform signal for all directions in a single modulator circuit.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
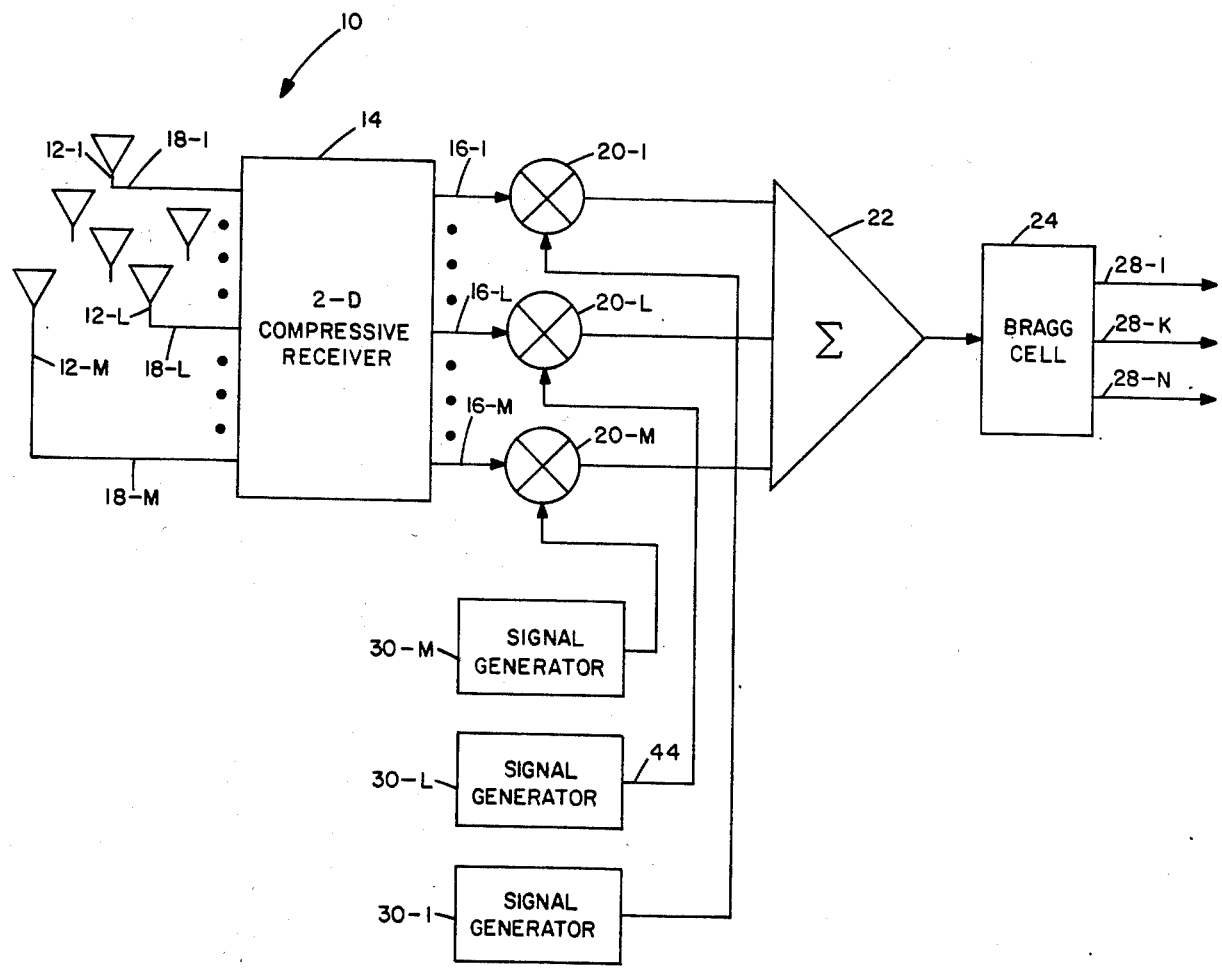
FIG. 1 is a block diagram of the system of the present invention.

FIG. 1 depicts the system of the present invention for simultaneously detecting the directions and temporal frequencies of signals from a number of sources simultaneously. An irregular antenna array 10 consists of M antenna elements 12. The outputs of the array elements are fed to a two-dimensional compressive receiver 14, which is an analog device for generating a two-dimensional Fourier transformation. That is, it transforms the ensemble of input signals from the time domain to the temporal-frequency domain and from the domain of relative spatial position at the input edge of the compressive-receiver delay line to the domain of spatial frequency.

Since the two-dimensional compressive receiver 14 transforms signals from the time and position domains to the temporal- and spatial-frequency domains, it is not necessary for the number of output ports 16 and the number of input ports 18 to be equal, as they are in the illustrated embodiment. There are reasons why this is an efficient arrangement, however, so compressive receivers are often arranged in this fashion.

The outputs of the two-dimensional compressive receiver 14 are fed to devices 20, depicted as multipliers, for translating the outputs in frequency and modulating them in amplitude and phase. The resultant signals are all fed to a summing device 22, which adds them together and feeds the result to a one-dimensional Fourier-transformation device, such as a Bragg cell 24 having N output ports 28. The direction of a source is indicated by the output port 28 on which it causes an output, and its temporal frequency is indicated by the time at which the output occurs in relation to the sweep of the compressive receiver 14.

To understand how the system of FIG. 1 finds the directions and frequencies of several signals simultaneously, first consider the manner in which signals from a single direction are detected. The array 10 is an array of antenna elements on a platform such as the skin of an aircraft. The antenna elements may be arranged irregularly; that is, they are not necessarily in a straight line, circle, or some other simple geometric pattern. Furthermore, they may be subject to reflection and mutual impedance. Nonetheless, they are arranged so that, if their outputs are appropriately processed, the array is focused on a selected direction.

For each antenna element, the processing typically includes a different phase and, optionally, a different gain or attenuation. The phase shift for a given direction is dependent on temporal frequency. To impose the phase shift directly at the antenna-element output ports, it would be necessary to use complex frequency-dependent filters.

By using the two-dimensional compressive receiver 14 to perform a temporal Fourier transformation, the arrangement illustrated in FIG. 1 avoids the use of such filters. The two-dimensional compressive receiver 14, as was stated above, also performs a spatial Fourier transformation. For the moment, however, this effect can be ignored, and we will initially consider only the temporal Fourier transformation.

The two-dimensional compressive receiver 14 repeatedly sweeps through a range of frequencies. On each of its output lines 16, the output that results at a given time within the sweep is caused only by those components of its inputs having the specific temporal frequency associated with that time within the sweep. For instance, if the output sweep of the compressive receiver lasts for 100 milliseconds and the range of the compressive receiver is 100 megahertz to 200 megahertz, an output pulse occurring at the very beginning of the sweep is caused by the 100-megahertz input components. Pulses occurring at 50 milliseconds into the output sweep represent the components whose temporal frequency is 150 megahertz. Any output pulse at the end of the sweep is caused by 200-megahertz input components.

Any narrow-band input causes a single compressive-receiver output pulse on each of one or more of the compressive-receiver output ports. Each pulse is in the form of a burst of oscillations whose frequency is the center frequency of the two-dimensional compressive receiver. The time of occurrence of the pulses within the sweep is determined by the input frequency, and their magnitudes and phases are determined by, among other things, the magnitude and phase of the narrow-band input signal. Since the phase and amplitude information contained in the compressive-receiver inputs is also present in its outputs, it is possible to focus the array by applying appropriate phase shifts at the compressive-receiver output ports, just as it is possible to do so by applying phase shifts at the input ports of the two-dimensional compressive-receiver 14. However, it is a simpler matter to impose the required phase shifts at the output ports of the two-dimensional compressive receiver because the compressive-receiver output signals at a given time within the sweep are produced by only a single temporal frequency. The required phase shifts and attenuations therefore do not have to be imposed by complex filters; they can simply be performed by multiplication.

Specifically, the multiplying factor can be a sine wave whose amplitude and phase correspond to the required attenuation and phase shift. The resultant signal is a frequency-translated version of the input signals with the desired modulation. (Of course, the undesired sidebands must be filtered out, and circuitry for performing this function may be included in the multipliers 20 or, in some cases, at the output port of the summer 22.) Accordingly, signal generators 30 generate signals whose phases and amplitudes vary with compressive-receiver output sweep and thus in accordance with the frequencies of the signals that gave rise to the pulses currently being multiplied. Each signal generator 30 transmits its signal to an associated one of the multipliers 20, which thereby applies the desired phase shift and, possibly, attenuation.

The resultant multiplier outputs are added in adder 22, and signal components from a chosen direction add constructively while components from other directions result in relatively low-amplitude signals and are thus eliminated. As a result, pulses of significant amplitude in the output of the summer 22 represent a source in the selected direction having a temporal frequency represented by the time within the compressive-receiver output sweep at which the pulse occurs. Thus, for surveillance in a single direction, the desired function of the system is achieved at the output port of the summer 22 without the Bragg cell 24. The Bragg cell 24 is needed for simultaneous surveillance in several directions.

Before discussing several-direction surveillance, however, we will return to the function of the two-dimensional receiver 14 as a device for performing a spatial Fourier transformation. In principle, the two-dimensional compressive-receiver 14 could be replaced with M one-dimensional compressive-receivers. The result would be that the output of the compressive-receivers would be temporal Fourier transformations without the spatial Fourier transformation. The waveforms that the storage devices 30 apply to the multipliers 20 would thus impose the same function of phase shift and attenuation versus frequency as would be required if the attenuations and phase shifts were performed immediately on the antenna-element outputs. (The complex filtering arrangement would still be avoided, though, because of the temporal Fourier transformation.) With the two-dimensional compressive-receiver 14, on the other hand, a spatial Fourier transformation is performed, so the waveforms from storage devices 30 have functions of attenuation and phase shift versus frequency that are different from the functions that would be used on the compressive-receiver inputs.

The reason for using a two-dimensional compressive-receiver rather than a number of one-dimensional receivers is twofold. In the first place, it turns out that the waveforms that would have to be applied to the multipliers 20 without the spatial Fourier transformation are, in general, signals whose bandwidths are significantly wider than those of the signals required after the spatial Fourier transformation has been performed. The spatial transformation thus reduces memory and speed requirements. Additionally, a single two-dimensional compressive-receiver is less expensive than several one-dimensional compressive-receivers are.

Although the spatial Fourier transformation results in a requirement for a different function of phase shift and attenuation versus temporal frequency, these waveforms are determined in essentially the same way as the attenuations and phase shifts would be without the spatial Fourier transformation; determining the waveforms is essentially a large calibration job. For each of a number of discrete combinations of azimuth and elevation angles and temporal frequency, a source at that azimuth and elevation is caused to radiate at that temporal frequency. Phase shifts and, optionally, attenuations at the compressive-receiver output ports are adjusted until a peak is reached in the output of the summer 22, and the resultant phase shift for that combination of azimuth, elevation, and temporal frequency is stored. Once the values have been determined for each frequency at a given elevation and azimuth angle, a complete waveform for that direction (i.e., elevation-azimuth combination) has been determined.

Although such a procedure can be expected to be time-consuming, it must be performed only once for any given array design. For a given type of aircraft, therefore, the waveforms for the aircraft's antenna array are determined once, and those waveforms are used for all aircraft of that design. This calibration procedure throws light on another advantage of using the spatial Fourier transformation; since the waveforms to be applied after a spatial Fourier transformation are more "well behaved"—i.e., vary more slowly—than those that would be applied without it, the number of temporal-frequency points at which data have to be taken is relatively low, so the calibration procedure is not as lengthy as it might otherwise be.

We now turn to the problem of monitoring several directions simultaneously. To do so, each waveform applied to a multiplier 20 is the sum of several different-frequency carrier signals, each one of which is modulated in accordance with a waveform for a different direction—i.e., a different combination of azimuth and elevation angle. It was stated before that the signals applied to each multiplier 20 for a single direction were in the form of an oscillator signal modulated with a phase and amplitude that vary with the time within the output sweep of the compressive-receiver. Although the function of amplitude and phase versus time (and thus temporal frequency) is determined by the desired direction, the actual frequency of the oscillator signal is arbitrary, and different oscillator-signal frequencies can be assigned to different combinations of azimuth and elevation. To monitor several directions simultaneously, a plurality of oscillator signals of different frequencies are applied to each multiplier 20, and each different-frequency oscillator signal is modulated with the amplitude and phase function associated with a different direction.

Figure 2:
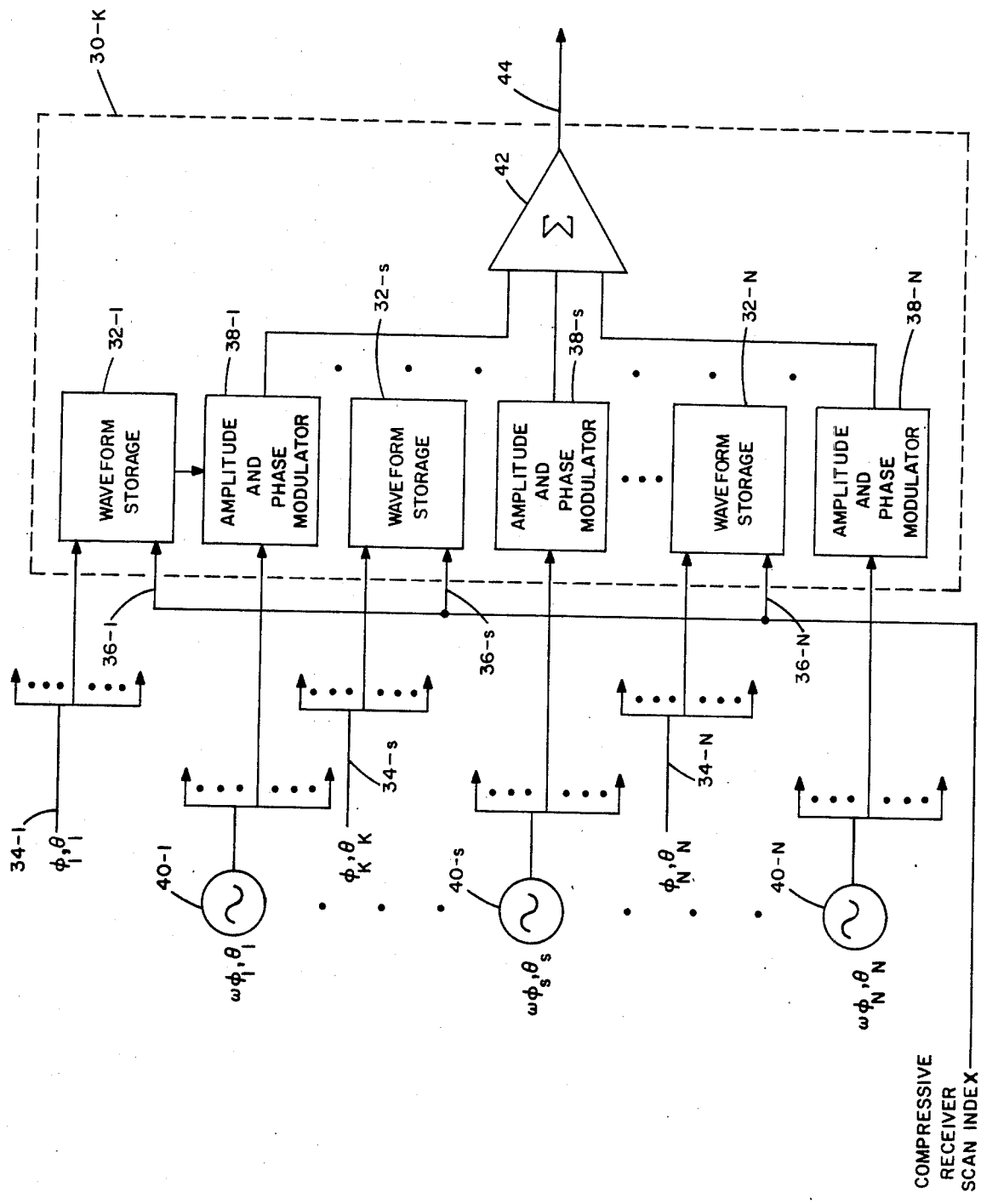
FIG. 2 is a detailed block diagram of one of the signal generators of FIG. 1.

FIG. 2 illustrates this scheme. In FIG. 2, signal generator 30-k is shown as including a plurality of waveform storage devices 32-l, . . ., 32-s, . . ., 32-N. Each waveform-storage device may be in the form of a read-only memory followed by a digital-to-analog converter, although other forms of the device may be employed. In general, each waveform-storage device 32 contains the waveform associated with at least one combination of azimuth and elevation angle, and I prefer that each device 32 contain the waveforms for all directions that could conceivably be of interest; all of the waveform-storage devices 32 for a given signal generator 30 whould then be identical. The read-only memory is addressed by address signals on lines 34 and 36, representing the selected direction and the time within the compressive-receiver output sweep, respectively.

To monitor several directions simultaneously, control circuitry (not shown) sends different signals on lines 34-l, 34-s, and 34-N to indicate the different directions that are to be monitored. At the same time, common timing signals are sent on lines 36 to synchronize the retrieval of the stored waveform with the output sweep of the compressive-receiver. The result is that the waveform-storage devices 32-l, . . ., 32-s, . . ., 32-N simultaneously generate waveforms containing the amplitude and phase functions for the different selected directions to be monitored.

These waveforms are applied to respective amplitude-and-phase modulators 38-l, . . ., 38-s, . . ., 38-N, which receive as inputs the outputs of oscillators 40-l, . . ., 40-s, . . ., 40-N. These oscillators oscillate at fixed frequencies that differ from one another by at least the bandwidth of the compressive-receiver output pulses. The amplitude-and-phase modulators 38 modulate the outputs of the oscillators 40 and apply the resultant modulated signals to a summing circuit 42, which adds the signals to generate a single sum signal on its output line 44. This is the output of signal generator 30-k of FIG. 1, which output is applied to multiplier 20-k.

Similar signal generators are associated with each of the other multipliers. All of the signal generators receive their oscillator signals from a common set of oscillators 40 and receive the same address signals having the same timing and designating the same set of directions. However, the waveform-storage devices in the other signal generators 30 have different contents, since the waveform to be applied to one of the outputs of the two-dimensional compressive-receiver 14 will not in general be the same as those to be applied to its other outputs.

Therefore, in FIG. 1, each multiplier 20 translates a compressive-receiver output by several different frequencies simultaneously so that its output consists of pulses in frequency ranges associated with the several oscillators 40. For each of those frequencies, the phases and amplitudes applied to the ensemble of compressive-receiver output signals is such as to cause the components of the ensemble caused by a source in the direction associated with the oscillator giving rise to that frequency to add in phase at the summing circuit 22. A similar result obtains for the other frequency ranges. Therefore, the output of the summing circuit 22 is the sum of, possibly, a number of pulses. Each pulse is a short burst of sinusoidal signal typically having a Gaussian amplitude envelope. For each pulse, the frequency of the signal within the envelope is an indication of the direction of its source. (Although signals from sources in all directions are multiplied by the outputs of all oscillators, only signals from sources in the direction associated with the given oscillator add up to a significant amplitude in the output of summer 22 when they are multiplied by the modulated output of that oscillator.) The time of the pulse within the compressive-receiver output sweep is an indication of the temporal frequency of the source that caused it. Thus, signals of the same frequency emitted by sources from two different directions will give rise to two superimposed pulses in the output of summer 22. The two pulses will have different frequencies within their envelopes because they are caused by sources located in different directions, but they occur at the same time because the antenna frequencies that gave rise to them are the same.

For two sources in the same direction having different frequencies, the output of the summer will be two pulses whose frequencies within their envelopes are the same but that occur at different times within the compressive-receiver output sweep. Thus, the time of occurrence indicates the source frequency, and the frequency within the pulse envelope indicates the source direction. To separate signals of the same frequency but different directions, the Bragg cell 24, a one-dimensional Fourier-transformation device, is employed. Although pulses of different frequencies are superimposed at the input port of the Bragg cell 24, they appear at different output ports 28. Thus, the output port 28 at which a pulse appears indicates the direction of the source that caused it, and the time of occurrence indicates the frequency at which the source radiates.

In some applications, it may be desirable to replace the Bragg cell with a one-dimensional compressive receiver and a demultiplexer. The Fourier transformations performed by the one-dimensional compressive-receiver would be produced at a much greater rate than those produced by the two-dimensional compressive-receiver. That is, within a given sweep of the two-dimensional compressive-receiver, the one-dimensional receiver would perform many Fourier transformations. This faster sweep would permit the one-dimensional compressive-receiver to perform the transformation without mixing the information from two sources of different frequencies lying in the same direction. The one-dimensional compressive-receiver would work with a very short record, so it would not simultaneously be processing pulses caused by sources of different frequencies. The difference in sweep rate would also prevent the one-dimensional compressive receiver from re-expanding the pulses compressed by the two-dimensional compressive-receiver.

The operation of this system will be described by considering a quantitative example. Suppose that the input range of the two-dimensional compressive-receiver 14 is 50–500 MHz and that its response to a single-frequency antenna signal is an output pulse in the form of a burst of 100-MHz oscillations having a Gaussian amplitude envelope whose duration gives the pulse a bandwidth of 20 MHz. Pulses of the resulting duration resolve input frequencies that differ by 25 kHz in a 900-microsecond output sweep. Thus, a pulse occurring at one of the output ports of the two-dimensional compressive receiver 14 at the beginning of an output sweep is caused by an antenna component of 50 MHz. A pulse occurring 500 microseconds into the output sweep is caused by antenna-signal components of 300 MHz, while a pulse occurring at the end of the output sweep is caused by 500-MHz components.

In a typical implementation, up to a hundred or more frequencies would be monitored simultaneously. For the sake of simplicity, however, our example monitors only four directions. Accordingly, only four oscillators 40 are employed. We will assume that the frequencies of these oscillators 40 are 200 MHz, 220 MHz, 240 MHz, and 260 MHz. One waveform-storage device 32 in each of the signal generators 30 is fed signals on its address lines 34 to designate the location of the waveform corresponding to the first direction, direction A. Address signals on lines 36 designate the portion of the waveform corresponding to the current time in the output sweep. The quantity fetched from the location specified by the address signals is converted to analog form, filtered, and applied to the modulator 38 in each of the signal generators 30 that receives the 200-MHz oscillator signal. The resultant modulated signal is applied to summer circuit 42, which also receives the 220-MHz, 240-MHz, and 260-MHz signals modulated by the waveforms associated with directions B, C, and D, respectively.

Now suppose that the antenna array 10 is receiving radio waves from five sources. The first source lies in direction A and radiates at a frequency of 55 MHz. The second source also lies in direction A, but it radiates at a frequency of 420 MHz. The third source also radiates at the 420 MHz frequency but lies in direction B. The fourth source lies in direction C and radiates at 300 MHz, while the fifth source lies in a direction X, which is not one of the directions currently being monitored, and radiates at a frequency of 200 MHz.

The radiation from all of these sources is received by all of the antenna elements 12 simultaneously and is thus applied simultaneously to the input ports 18 of the two-dimensional compressive-receiver 14. The two-dimensional compressive-receiver 14 performs both a temporal Fourier transformation and a spatial Fourier transformation. The relationship between the direction in which a source lies and the output ports 16 on which the results of the Fourier transformation of its signals appear is complicated; if the array 10 were a linear array, the results of radiation from a given source would likely predominate on one or two of the output ports 16 of the two-dimensional compressive-receiver 14 and contribute only negligibly to the outputs on the other output ports 16. In an irregular array, on the other hand, significant results of the radiation from a given source will often appear on all or most of the output ports 16 of the two-dimensional compressive-receiver 14. However, since the two-dimensional compressive-receiver 14 performs not only a spatial Fourier transformation but also a temporal Fourier transformation, the result of radiation at a single frequency is isolated in time.

The first source, for instance, which radiates at frequency of 55 MHz, will cause an ensemble of pulses in the various output ports $16\text{-}l, \ldots, 16\text{-}k, \ldots, 16\text{-}M$. All of the pulses are bursts of 100-MHz oscillations occurring at 10 microseconds into the output sweep of the two-dimensional compressive-receiver 14. That is, at 10 microseconds into the output sweep of the compressive receiver 14, 100-MHz bursts appear at all or most of the output ports 16 with different amplitudes and phases. The pulse on each line 16 is modulated in the corresponding multiplier 20 with a sum of the four signals generated by modulators 38. That is, on each line, the pulse is modulated by the sum of modulated 200-, 220-, 240-, and 260-MHz signals, but the modulating signal is different, in general, for the pulse on each, line since the waveforms used by the modulators 38 associated with that particular output line differ from the waveforms employed by the modulators associated with the other output lines.

As was stated before, multipliers 20 include filters to eliminate unwanted sidebands. The resultant filtered signal is the sum of a number of components centered at frequencies of 300 MHz, 320 MHz, 340 MHz, and 360 MHz. The overlapping of these components is negligible. The reason is that the 100-MHz pulses appearing in the output of the two-dimensional compressive-receiver 14 have a bandwidth of 20 MHz, while the waveforms that modulate the oscillator-output signals are very "well behaved"; that is, they have narrow bandwidths and thus do not contribute significantly to the bandwidth of the resultant modulated signal. Since the compressive-receiver outputs have bandwidths of 20 MHz, and since the oscillator frequencies are separated by 20 MHz, the components caused by the different oscillators in the outputs of the multipliers 20 do not overlap significantly.

When the signals from all of the multipliers 20 are added together in the summing circuit 22, the various signals in a given frequency range are added and subtracted from each other. Since the waveforms with which the 200-MHz oscillator is modulated are chosen to favor direction A, and since the first source lies in direction A, the results of modulation of the pulses by the 200-MHz signal all add constructively in the summer circuit 22 and thus cause a significant output. On the other hand, the waveforms applied to the 220-, 240-, and 260-MHz signals are chosen to favor other directions, so the results of the modulation of the pulses by these signals do not add in phase and thus cause little significant output in the summing circuit 22. Accordingly, the only significant output of the summing circuit 22 at the time corresponding to 10 microseconds into the output sweep of the two-dimensional compressive receiver 14 is centered at 300 MHz (the 200-MHz oscillator signal mixed with the 100-MHz pulse).

The Bragg cell 24 has four output ports corresponding to four 20-MHz frequency bands centered at 300 MHz, 320 MHz, 340 MHz, and 360 MHz. At 10 microseconds into the output sweep of the compressive receiver 14, a pulse appears at the 300-MHz output port. The fact that the pulse occurs on the 300-HMz output port indicates that the source that caused it lies in direction A. Since it occurs at 10 microseconds into the compressive-receiver sweep, its frequency is 55 MHz.

No other significant outputs of the Bragg cell 14 occur until 500 microseconds into the compressive-receiver sweep. Before that, at 300 microseconds, pulses caused by the fifth source do occur at the compressive-receiver output ports. Since the waveforms by which they are modulated do not favor direction X, however, the resultant signals do not add in phase in summing circuit 22, so they cause no significant output. In other words, the system does not detect signals from sources in direction X, because it is not "looking" in that direction.

At 500 microseconds into the compressive-receiver sweep, a pulse occurs at the 340-MHz output port, indicating that the source that caused the pulse lies in direction C and radiates at 300-MHz. Then, at 760 microseconds, pulses occur at both the 300-MHz output and the 320-MHz output port. This indicates that two sources are radiating at the same frequency, 420 MHz, but lie in two different directions, directions A and B.

Although the invention has been described in connection with a specific embodiment, it can be realized in apparatus that differs significantly from the specific arrangement described in the specification. For instance, the two-dimensional compressive-receiver 14 could in principle be replaced by some other device for performing a two-dimensional Fourier transformation. In fact, there is no requirement, in order to obtain certain of the benefits of the present invention, that a two-dimensional transformation be used at all. The two-dimensional compressive-receiver 14 of the illustrated embodiment could be replaced with a separate one-dimensional temporal-Fourier-transform device for each antenna element. I do not consider this preferable because, as was stated above, this would result in modulating signals of higher bandwidths in most instances, but it may prove beneficial in certain applications.

Additionally, the Bragg cell 24 could be replaced with a one-dimensional Fourier-transform device 24 such as a compressive-receiver, as was suggested above, or a discrete-Fourier-transform circuit. In fact, it could be replaced with parallel bandpass filters, each filter being tuned to one of the frequency-translated signals. In the illustrated example, for instance, bandpass filters having ranges of 290–310 MHz, 310–330 MHz, 330–350 MHz, and 350–360 MHz would be employed.

The signal generators, too, could be realized in many alternate forms. In the illustrated embodiment, each waveform-storage device 32 contains the waveforms for its associated compressive-receiver output port for all directions that might be monitored. Thus, any oscillator can be used for any direction. A savings in hardware would result from storing waveforms for only certain of the desired directions in the waveform-storage devices 32 associated with a given oscillator 40. In this way, the system could monitor any given one of the desired directions, and it could monitor several of them simultaneously, but some combinations of directions could not simultaneously be monitored.

Furthermore, those skilled in the art will recognize that other means of storing waveforms, modulating, and translating can be employed. The present invention thus has a wide range of applicability and constitutes a significant advance in the art.

What is claimed as new and desired to be secured by Letters Patent of the United States is:

1. For use with an array of antenna elements that generate element signals in the presence of radio waves, a system for determining direction and frequency of the radio waves, comprising:

A. a Fourier-transformation device, including an input port associated with each antenna element and adapted for reception of the element signal therefrom, for performing a temporal Fourier transformation on the element signals to generate a plurality of transform signals in which the time at which a transform-signal component occurs indicates the temporal frequency of the element-signal component that gives rise to it;

B. a plurality of oscillators generating a like plurality of oscillator outputs, respectively;

C. means for storing modulation data to respectively modulate each transform signal, the modulation data, for each transform signal, being associated with each of a plurality of predetermined directions, each direction being associated with a respective oscillator and termporal frequency, the result of modulating each transform signal with the modulation data being to effect a coherent summation for each external source;

D. a modulator-translator circuit associated with each transform signal, each modulator-translator circuit being connected to receive the transform signal associated therewith and including:

i. a plurality of preliminary modulators, associated with respective ones of the oscillators and connected to receive the outputs of their associated oscillators, for fetching from the waveform-storage circuit the modulation data associated with the directions associated with the associated oscillators and with the temporal frequency of the element-signal components giving rise to the currently occurring transform-signal components, and for modulating the oscillator outputs in accordance with the fetched modulation data associated with the directions associated therewith to generate, for each of the directions, a preliminary-modulator signal associated with the associated transform signal;

ii. a preliminary summation circuit, connected to receive all of the preliminary-modulator signals generated from the associated transform signal, for adding them together to generate a preliminary summation signal associated with the associated transform signal; and iii. a main modulator, connected to receive the associated transform signal and the preliminary summation signal associated therewith, for modulating the associated transform signal with the preliminary summation signal to generate a main-modulator signal associated with that transform signal;

E. a main summation circuit, connected to receive the main-modulator signals associated with all of the transform signals, for adding them together to produce a main summation signal; and F. a frequency-segregation circuit connected to receive the main summation signal and generate therefrom a segregated output in which the segregated-output components generated from different oscillators are separated from each other to indicated the directions of the sources of the element signals that give rise to the segregated output.

2. A system as defined in claim 1 wherein the Fourier transformation device comprises a device for generating the transform signals by performing a two-dimensional temporal-spatial Fourier transformation on the element signals.

3. A system as defined in claim 2 wherein the device for performing the two-dimensional Fourier transformation comprises a two-dimensional compressive-receiver.

4. A method for determining the functions of phase shift and attenuation versus azimuth, elevation angle, and temporal frequency for use with an array of antenna elements that generate element signals, together with a Fourier-transformation device having an input port associated with and operably connected to each antenna element for performing a temporal Fourier-transformation on the antenna element signals, the Fourier-transformation device also having a plurality of output ports, comprising the steps of:

A. for each of a plurality of discrete combinations of azimuth, elevation angle, and temporal frequency, causing a source to radiate at a given temporal frequency and azimuth and elevation angle;

B. adjusting the phase shift and attenuation at a plurality of output ports of the compressive receiver until a maximum value is reached in the sum of the compressive-receiver output ports, thereby obtaining a phase shift value and an attenuation value; and C. storing in a data storage device the phase shift value and attenuation value associated with each discrete combination of azimuth, elevation angle and temporal frequency.

* * * * *